United States Patent [19]

Oliff

[11] 4,051,759
[45] Oct. 4, 1977

[54] MITER BOX FOR A PORTABLE ELECTRIC SAW

[76] Inventor: Gerald Oliff, 8530 N. Harding Ave., Skokie, Ill. 60076

[21] Appl. No.: 761,246

[22] Filed: Jan. 21, 1977

[51] Int. Cl.² .......................... B26D 7/26; B27G 5/02
[52] U.S. Cl. .................................. 83/471.3; 83/473; 83/486.1; 83/581; 83/594
[58] Field of Search .................. 83/471.2, 471.3, 472, 83/473, 477.2, 581, 594, 821, 761, 486.1

[56] References Cited

U.S. PATENT DOCUMENTS

| 2,949,139 | 8/1960 | Nolte | 83/471.3 X |
| 3,320,982 | 5/1967 | Kwiatkowski | 83/471.2 X |

Primary Examiner—Willie G. Abercrombie
Attorney, Agent, or Firm—Norman H. Gerlach

[57] ABSTRACT

An elongated hollow miter box embodying spaced-apart top and bottom walls has its ends bevelled on a 45° bias. A pair of fixed guide edges on the top wall of the box are parallel to the bevelled ends and serve to guide the usual slide shoe of a portable electric saw over the top wall to effect a 45° cut through either end of a wooden molding or other strip which is positioned and held on the bottom wall of the box. Near one end of the box, a transverse cross cut in the top wall cooperates with an auxiliary guide piece which, when placed on the top wall, presents an edge which guides the saw shoe transversely over the top wall and enables a 90° cut to be made in the wooden strip. An opening in the medial region of the top wall affords finger access to the molding or other wooden strip for steadying purposes during making either a 45° or a 90° cut.

20 Claims, 6 Drawing Figures

MITER BOX FOR A PORTABLE ELECTRIC SAW

The present invention relates generally to miter boxes of the particular type which is employed as a guide for cutting wooden molding or other strips at either a 45° or a 90° angle with respect to their side edges for the production of either rectangular border frames, such, for example, as those which are used in connection with doors, windows, and walls, or art frames or the like which require that the abutting end edges of their frame-forming strips fit closely together at the frame corners so as to present a proper and desirable finished appearance.

Heretofore, miter boxes which have been available for portable electric saws, particularly miter boxes which are designed for effecting 45° end cuts, are usually bench or table mounted and, in this sense, they are not truly portable or readily movable from place to place. Moreover, in converting from one 45° cut to another 45° cut at a right angle to the first cut, adjustable swinging guides have been provided and they require careful adjustment by utilizing either a scale and pointer or an adjusting template. Some mitering boxes for use with portable saws are double-ended so that the two 45° angle cuts may be made by selecting first one end of the box and subsequently selecting the other end thereof. However, due to the fact that the saw blade of a portable electric saw projects through a slot in the usual saw slide plate or shoe which is not centrally disposed between the inside and outside side edges of the shoe, if the first cut is made from front to rear, the second cut must be made from rear to front. This requires walking around the supporting table or bench and this is not always possible or convenient. In such an instance, it is necessary to provide laterally adjustable shoe guides to accommodate the off-center saw blade. Obviously, the use of either swinging guides or laterally shifting guides is subject to error in judgment, besides being extremely troublesome.

The present invention is designed to overcome the above-noted limitations that are attendant upon the construction and use of present-day miter boxes for portable electric saws and, toward this end, it contemplates the provision of an elongated hollow open-ended miter box which embodies walls of appreciable thickness and has its ends bevelled in opposite directions on a 45° angle bias. Medially of its ends, the top wall of the miter box is formed with a relatively large access opening which is designed for reception of the fingers of the user of the box so that a wooden molding strip or the like to be cut may be steadied during cutting at either end thereof. On each side of such opening, a raised guide edge which is parallel to the adjacent bevelled end of the miter box is designed for mating sliding engagement with the inside edge of the conventional slide plate or shoe of the portable electric saw being used so that as the shoe is slid along such edge while seated on the top wall, the rotary blade of the saw traverses the adjacent bevelled edge of the miter box and performs the desired 45° cut in the adjacent end of the molding strip. If it is desired to effect a 90° cut, a generally triangular auxiliary guide member which normally is separate from the miter box but which is readily applicable thereto by locating means, is applied to the top wall of the box and this auxiliary guide member then presents a guide edge which, when followed by the saw shoe, carries the rotary saw blade through a transverse cross-cut in one end portion of the top wall of the miter box. Cuts at the opposite ends of any wooden molding strip, regardless of the length of the strip, may be made without the necessity of withdrawing the strip from the miter box and turning it end-for-end even if the end cut is made on a 45° angle.

The provision of a miter box such as has briefly been outlined above and possessing the stated advantages constitutes one of the principal objects of the present invention.

Another and important object of the invention resides in the fact that because the present miter box is totally portable and does not require anchoring to a work bench or table, the necessity for walking around the bench or table when changing from a front-to-rear cut to a rear-to-front cut and vice versa, is eliminated, it being necessary merely to reverse the miter box on the support which is being used so that all cuts may be made with the operator remaining in the same place.

The provision of a miter box which is expressly for use in connection with a portable electric saw and is of such relatively simple design or construction that it may be manufactured at a relatively low cost; one which may be constructed almost entirely from wood stock, thereby further contributing to low cost; one which is comprised of a minimum number of parts and with no moving parts whatsoever and, therefore, is unlikely to get out of order or adjustment; one which is rugged and durable and, therefore, will withstand rough usage; one which requires no special degree of skill on the part of the operator for its use; and one which otherwise is well-adapted to perform the services required of it, are further desirable features which have been borne in mind in the production and development of the present invention.

Numerous other objects and advantages of the invention, not at this time enumerated, will become readily apparent as the nature of the invention is better understood from a consideration of the following detailed description.

The invention consists in the several novel features which are hereinafter set forth and are more particularly defined by the claims at the conclusion hereof.

In the accompanying two sheets of drawings forming a part of this specification, one illustrative embodiment of the invention is shown.

Figure 4:
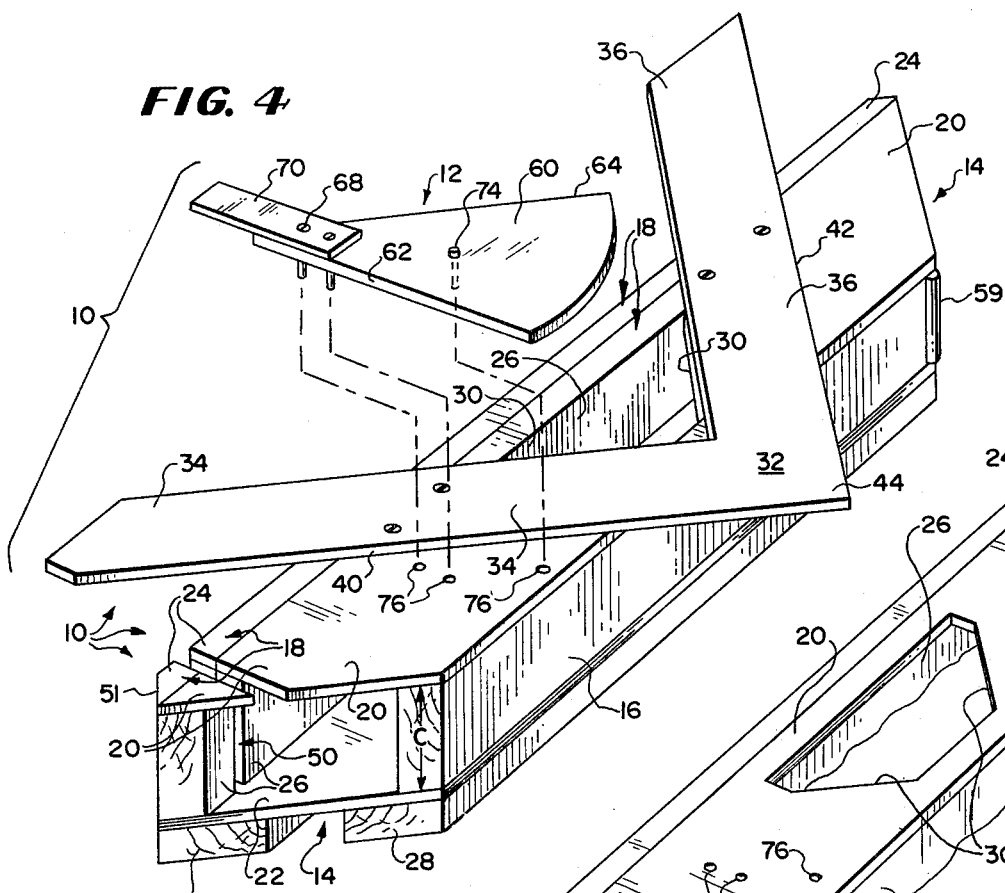
FIG. 4 is an enlarged front top perspective view similar to FIG. 2 and showing in exploded fashion the relationship between the auxiliary conversion guide piece and the main body of the improved miter box and by means of which conversion may be made to effect by way of the associated saw a 90° cut instead of a 45° cut.

Referring now to the drawings in detail and in particular to FIG. 4, the miter box constituting the present invention is comprised of two main components, namely, a miter box proper 10 and an auxiliary guide piece 12. The function of the guide piece 12 is to convert the miter box 10 from a condition for effecting 45° cuts to a condition for effecting 90° cuts, the conversion being made simply by applying the guide piece to the miter box in a manner that will be made clar subsequently.

The miter box proper 10 is preferably made of wood and it involves in its general organization an elongated open-ended tubular body 14 which is generally rectangular in cross section and includes a front wall 16, a composite rear wall 18, a top wall 20, and a bottom wall 22. In the exemplary form of the invention disclosed herein, the rear wall 18 is preferably, but not necessarily, comprised of two lengths or pieces of board stock and they are nailed, glued, or otherwise fastened together in face-to-face relationship, the wall thus being of dual thickness. The front wall 16 is comprised of a single length or piece of wooden board stock, while the top and bottom walls 20 and 22 are preferably formed of pressed fiberboard, plywood, or other suitable relatively thin flat stock.

Figure 5:
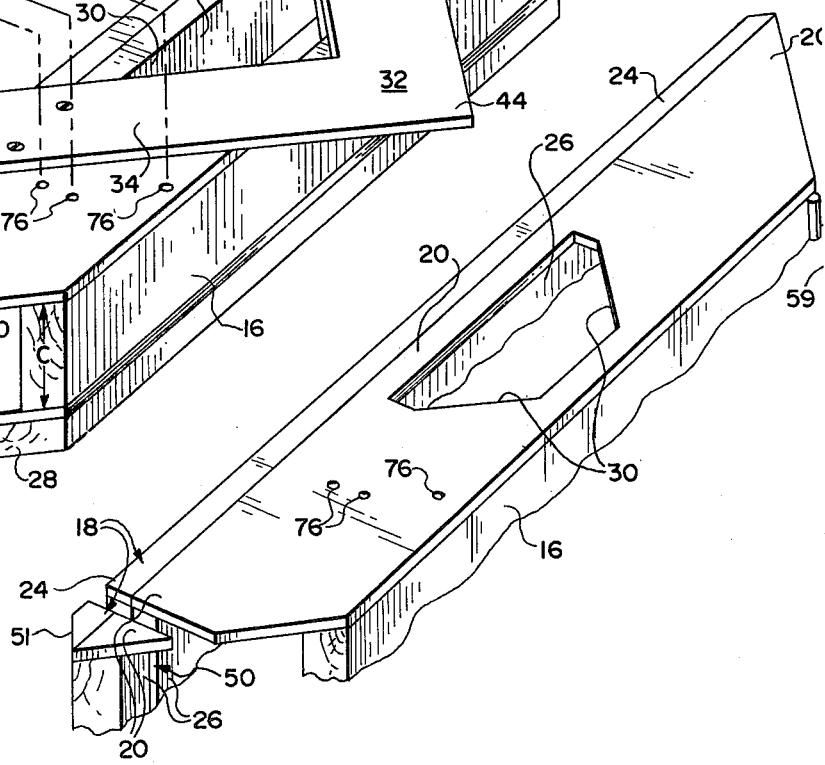
FIG. 5 is a fragmentary top perspective view of the miter box proper, that is, the box with its various saw-guiding instrumentalities.

As best shown in FIGS. 4 and 5 of the drawings, the dual thickness rear wall 18 of the tubular body 14 of the miter box proper consists of an outer wall board 24 and an inner wall board 26, the latter board having its top surface terminating a slight distance below the top surface of the former board, thus providing a narrow ledge on which the rear marginal portion of the top wall 20 sears and to which said front marginal portion is suitably fixedly secured. The front marginal portion of such top wall 20 seats upon the upper edge region or surface of the front wall 16 and is suitably fixedly secured thereto. A pair of longitudinally extending base supports 28, which extend lengthwise of and coextensive with the bottom wall 22 and are spaced apart so that they extend in parallelism, serves as supporting rails for the entire miter box proper 10. The top wall 20 of the miter box body 10 is trapezoidal in shape, as also is the bottom wall 22, both walls being of identical outline. The involved trapezoid is a 45° angle trapezoid and since the front and rear walls 16 and 18 of the tubular body 14 of the miter box proper 10, as well as the bottom supports or rails 28 are cut at their ends commensurately with the sides of the trapezoid, the general planes of the open ends of the miter box body 14 are forwardly divergent at a right angle.

As best shown in FIG. 5 of the drawings, the top wall 20 of the box body 14 is formed with a generally trapezoidal cut-out or opening 30 in the medial region thereof. The trapezoid involved in connection with the outline of the top wall 20, and also the trapezoid involved in connection with the outline of the opening 30, both have their large bases presented rearwardly and their small bases presented forwardly. The function of the opening 30 will be set forth presently when the operation of the miter box is discussed.

Positioned fixedly on the top wall 20 by means of screws 31 and in such a manner as to have the medial portions of their inner side edges register with the top wall edges which define the sides of the cut-out or opening 30 is a V-shaped guide member 32 having left and right guide arms 34 and 36 which extend at a right angle to each other, the guide member as a whole being formed of thin flat stock like the material of which the top and bottom walls 20 and 22 of the tubular body 14 are formed, and presenting narrow, rectilinear, outer guide edges 40 and 42, the function of which will be made clear subsequently when the operation of the miter box is described. The apex region 44 of the guide member 32 overhangs the front wall 16 of the tubular body of the miter box proper 10, while the distal ends of the left and right arms 34 and 36 overhang the rear wall 18 of said tubular body.

The front wall 16, the rear wall 18, as well as the top and bottom walls 20 and 22 of the tubular body 14, may be secured together in their respective positions as heretofore described in any suitable manner, as, for example, by nailing or gluing them to one another or by a combination of both nailing and gluing, the only requisite being that, when assembled, they constitute a rigid open-ended box-like structure having the general shape characteristics as outlined above.

Still referring to FIGS. 4 and 5 of the drawings, it will be observed that the left-hand end region of the miter box body 14 differs from the right-hand end region thereof in that a transverse cut 50 extends through the miter box body 14 at a predetermined location and is designed for cooperation with the aforementioned separate guide piece 12 in a manner and for a purpose that will be made clear hereafter. The cut 50, of course, does not extend completely through the miter box body 14 and its depth reaches only to the level of the upper face of the bottom wall 20. It thus passes completely through the outer wall board 24 adjacent to its left-hand end, through the inner wall board 26, and through the left-hand corner region of the top wall 20.

The other or right-hand end region of the miter box body 14 is devoid of such a transverse cut, although the provision of a transverse cut therein might, in a small measure, add to or further the usefulness of the miter box as a whole.

Figure 1:
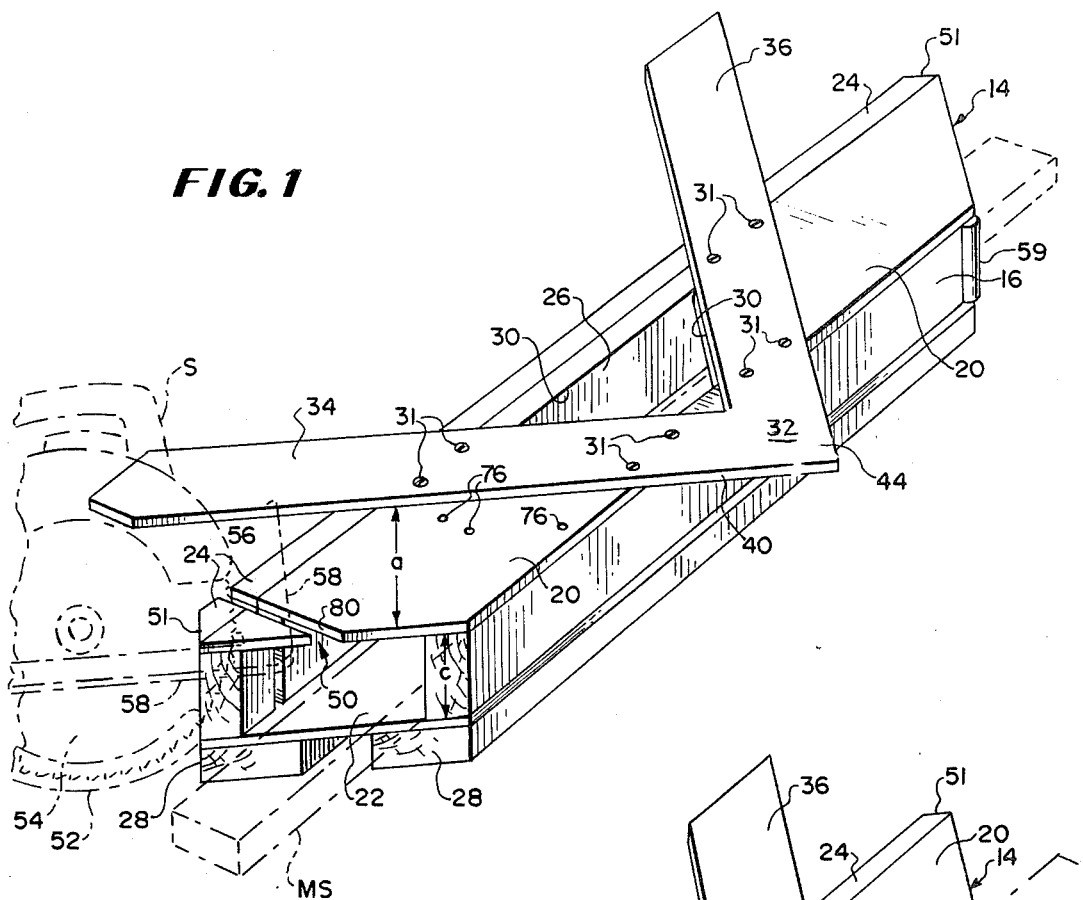
FIG. 1 is a front top perspective view of a miter box embodying the present invention, such view showing the box conditioned to guide an associated portable electric saw so as to make a 45° cut in the adjacent end of a wooden molding strip.

Disregarding for the moment the auxiliary conversion guide piece 12 and also disregarding the nature and function of the transverse cut 50, and referring, additionally, to FIG. 1, and bearing in mind that the present miter box proper 10 is designed primarily for making 45° cuts through wooden molding or other strips so that strips with the ends thereof cut at a 45° angle may be positioned together in end-to-end fashion to construct a 90° angle, for example, in the production of a rectangular border frame containing four such cut strips, a first cut may be made in the manner illustrated in FIG. 1 wherein the molding strip MS which is to be cut is positioned so that it extends lengthwise through the tubular body 14 of the miter box proper 10 and has its left-hand end projecting slightly beyond the left-hand end of the miter box as shown in dotted lines in this view. The generally trapezoidal opening 30 affords access to the interior of the miter box 10 so that by projecting four fingers of the left hand through such opening and engaging one side surface of the molding strip MS, the operator may hold the molding strip in a true longitudinal position so that the bottom face of the molding strip rests upon the bottom wall 22 of the miter box while the rearmost side surface of the strip bears squarely against the inner or front surface of the inner wall board 26 of the rear wall 18. It will be understood, of course, that the strip MS will be measured and properly marked with a pencil or other marking implement and the mark brought into register with the plane of the open left-hand end of the miter box which, as previously stated, extends at a 45° angle to the longitudinal axis of the miter box. Thereafter, by passing the slide plate or shoe of a hand-held portable electric saw such as is shown in dotted lines in FIG. 1 and designated in its entirety by the reference numeral S over the left-hand end portion of the upper horizontal surface of the top wall 20 of the miter box 10 in a guided manner as will be described presently, the desired 45° cut may be made through the left-hand end of the molding strip MS, it being, of course, understood that the end portion of the molding strip that is outwards of the 45° cut falls to the floor after completion of the cut and may, if desired, be discarded.

It is to be noted at this point that the plane of the aforementioned left-hand end face of the tubular miter box body 14 extends at an angle of 45° to the longitudinal axis of such body, and also that the narrow outer guide edge 40 on the left-hand arm 34 of the V-shaped guide member 44 is also on a 45° angle so that such face and edge are in true parallel relation. The distance between the guide edge 40 and the left-hand end face of the miter box body is a critical distance in that it is essential that it be commensurate with the distance between the saw blade 54 of the particular saw S for which the miter box is designed and the linearly straight inside edge 56 of the usual slotted slide plate or shoe 58 which is associated with such saw. This distance is designated in FIG. 1 by the dimension labelled $a$ and it will vary for saws which are made by different manufacturers and, sometimes, by saws which are made by the same manufacturer under different model numbers or designations. Many of the larger saws embody an $a$ distance of $4\frac{1}{4}$ inches while many smaller saws embody a distance of $3\frac{1}{2}$ inches for the dimensional distance $a$, and thus, it will be understood that each particular miter box body 14 will be designed to fit or suit a particular electric saw model with which the same is to be used or, at least, with the necessary dimension $a$.

When the electric saw S is passed in the usual manner of sawing operation from the rear of the miter box forwardly over the flat top wall 20 with the saw slide plate or shoe 58 resting flush with the top wall and with the inside edge 56 of the shoe 58 bearing against the outer guide edge 40 of the left-hand arm 34 of the V-shaped guide member 32, the saw blade will ride against the adjacent 45° left-hand end face of the miter box body 14 and the required 45° cut will be made through the adjacent outwardly projecting end of the molding strip MS.

It is to be noted that the extreme left-hand end of the outer wall board 24 of the rear wall 18 of the miter box body 14 beyond the transverse cut 50 is truncated so as to establish a vertical planar surface 51, the plane of which extends at a right angle to the outer guide edge 40 of the left-hand arm 34 of the V-shaped guide member 32. This planar surface is provided for the purpose of exerting a camming action on the adjacent end of the usual rotatable arcuate safety guide or shield 52 which is invariably associated with a conventional hand-held type portable electric saw. When effecting the 45° cut as previously described, shortly after the rotary blade of the saw S enters the bevelled left-hand end region of the miter box body 14, one end of this safety shield 52 encounters and abuts against the truncated planar surface 51 with the result that the shield remains stationary during advance of the saw blade 54 across the bevelled open end of the body 14, thereby resulting in progressive exposure of the lower portion of the rotary blade of the saw.

After the 45° cut has been made through the left-hand end of the molding strip MS, the longitudinal position of the strip within the miter box body 14 may be readjusted in an appropriate manner, the generally trapezoidal opening 30 in the top wall 20 being again employed for the manual clamping of the molding strip MS in position, and the other or righthand end of the miter box casing 14 being employed to make a second 45° cut. This latter cut through the molding strip MS, of course, extends at an angle of 90° with respect to the first cut and with the cut being made from front to rear. Since the vertical plane of the front wall 16 of the miter box body does not extend at a 90° angle to the adjacent guide edge 40 of the right guide arm of the V-shaped guide member 32 (see FIG. 2), but rather extends at an angle of 135°, a short vertical guide strip 59 is fixedly secured to the extreme right-hand marginal portion of the front wall 16 of the miter box body and serves the same purpose as the aforementioned trauncation planar surface 51 at the left-hand end of said miter box 14. The vertical strip 59 affords a more reliable abutment and cam member for the swinging safety guide 52 of the portable electric saw S.

Where relatively short lengths of molding strips are undergoing treatment, and where such strips are rectangular in cross section, the same cutting effect may be attained by using the same end region of the miter box body 14, it being necessary merely to make the required longitudinal adjustment of the strip and then inverting the same within the miter box body. Where fluted or other decorative molding strips are concerned, it is nearly always necessary to utilize both ends of the miter box body 14 for making successive 45° cuts at right angles to one another.

Figure 2:
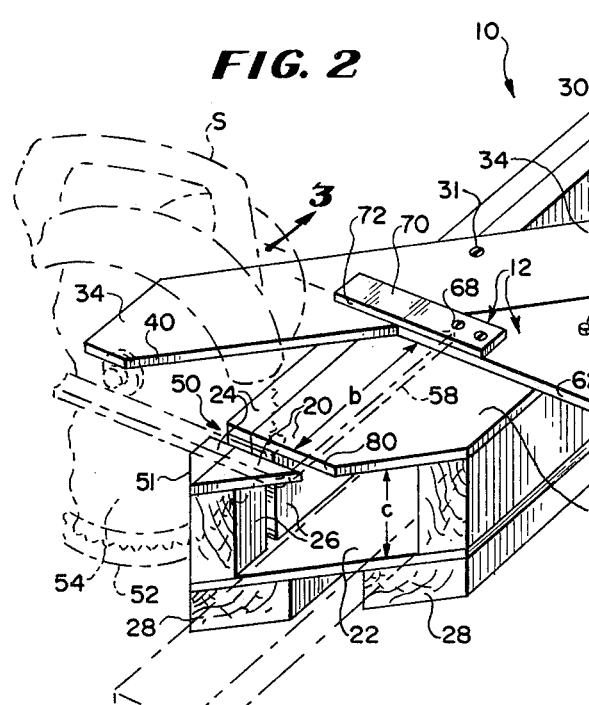
FIG. 2 is a front perspective view similar to FIG. 1 but showing the miter box conditioned to guide the saw so as to make a 90° cut in the adjacent end of a wooden molding strip.

Under some circumstances, it may be required to effect 90° cuts through the opposite ends of a particular molding strip. In such an instance, the auxiliary guide piece 12 is employed in conjunction with the transverse cut 50 as illustrated in FIG. 2 of the drawings. Such guide piece 52 appears in FIGS. 2 and 4 and it is comprised of a flat generally triangular plate-like part 60 of sector-shape design and having linearly straight, outwardly divergent side edges 62 and 64 and an arcuate end edge 66. Suitably secured, as by a pair of screws 68 to the upper face of the part 60 is a combined extension and locating arm 70 which conveniently may be of rectangular design and presents one linearly straight side edge 72 which lies in the same vertical plane as that of the side edge 62 of the part 60 and serves a purpose that will be made clear presently. The part 60 may be made of the same stock as that of the V-shaped guide member 32, but in any event, its thickness is precisely the same as the thickness of said guide member 32. As clearly shown in FIG. 4, the screws 68 which secure the arm 70 to the sector-shaped part 60 project completely through this latter piece and they with an additional screw 74, which also projects completely through the part 60 in an appropriate medial region of the latter, constitute locating pins that are designed for cooperation with three commensurately disposed locating sockets 76. Two of such sockets are formed in the medial region of the top wall 20 of the miter box body 14 (see FIGS. 1, 3, 4, and 5) and the third socket is formed adjacent to the front edge of such top wall.

In order to effect a 90° cut through the molding strip MS, the auxiliary guide piece 14 is positioned on the left-hand region of the miter box body 14 as illustrated in FIG. 2 and so that the lower ends of the three screws 68, 68, 74 (locating pins) become seated within the three sockets 76, and at this time, the straight side edge 64 of the part 60 of the auxiliary guide piece 12 will lie flush with the edge 40 of the left-hand arm 34 of the V-shaped guide member 32 while the arm 70 will rest upon the upper face of the arm 34 so that the side edge 72 of the arm 70 will constitute, in effect, a rearward extension of the side edge 62 although the former edge is slightly offset or displaced upwardly from the horizontal plane of the top wall 20 of the miter box body 14. The various locating pins and sockets, in combination with the meeting edges 64 and 40 thus rigidify the auxiliary guide piece 12 in its operative position on the miter box body. With the parts thus in position, when the molding strip MS is projected through the elongated hollow miter box body 14 in the manner previously described in connection with the creation of a 45° cut, and the desired extent of the molding strip is caused to overhang the transverse cut 50. As shown in FIG. 2, the substantially aligned edges 72 and 62 are employed as guide edges for the inside edge of the slide plate or shoe 58 of the saw S.

It is to be noted at this point that the dimension labelled $b$ which represents the distance between the edge 62 and the right hand or inside edge 80 of the transverse cut 50 is precisely the same in magnitude as the dimension labelled $a$ so that as the saw S is pushed forwardly, the saw blade 54 will traverse the cut 50 and thus sever the overhanging end portion of the molding strip MS on a 90° bias.

In addition to the dimension labelled $a$ and the dimension labelled $b$, a third critical dimension labelled $c$ represents the distance between the upper faces of the top and bottom walls 20 and 22. This dimension $c$ is equal to the effective cutting depth of the saw blade 54, i.e., the distance which the saw blade projects below the slide plate or shoe 58. If a greater distance than that specified for the dimension $c$ were employed, the saw blade would cut through the bottom wall 22, and if a lesser distance were employed, the saw blade would not cut completely through the molding strip MS.

To complete the desired length of molding strip MS, either the strip may be reversed in end-to-end fashion for performance of the second 90° cut, or alternatively, especially if the strip to be cut is relatively short, the molding strip may be slid through the open-ended miter box body and gripped with the fingers of the operator, utilizing the trapezoidal opening 30 for gripping access, and the molding strip then cut at the desired region.

Figure 6:
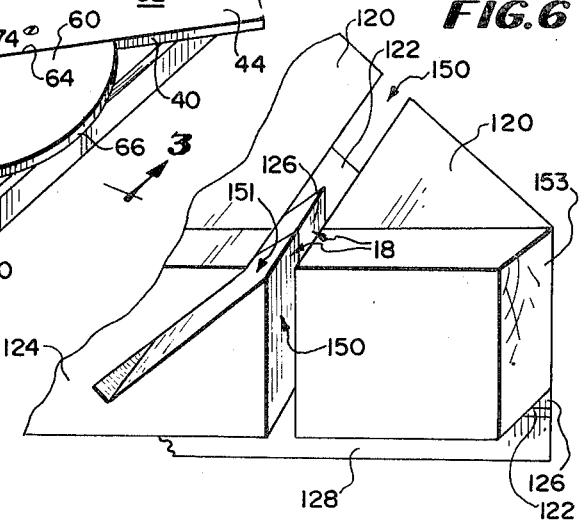
FIG. 6 is a fragmentary rear top perspective view of one end of the miter box as shown in FIG. 5.

In FIG. 6, a modified form of the invention is shown. The fragmentary illustration of this view discloses an arrangement whereby a 90° cross-cut may be effected in a molding strip on a 45° undercut bias. Comparing the fragmentary illustration of FIG. 6 with the left-hand end region of FIG. 2, and utilizing similar reference numerals but of a higher order to designate similar parts in order to avoid needless repetition of description, an additional cross-cut 151 which registers or is coincident at its upper edge with the cross-cut 150 extends through the rear wall 18, i.e., the outer and inner wall boards 124 and 126, this latter cut 151 being made on a 45° undercut bias. When such a cut 151 is provided, the operator may set or adjust his electric saw S for either a vertical cut or for a 45° undercut. When making a vertical cut, the saw blade 54 will pass through the vertical cross-cut 150. When making a 45° undercut, such saw blade 54 will pass through the cut 151. Otherwise, the left-hand end of the miter box body 14 remains substantially the same as it is depicted in FIGS. 1 to 4, inclusive.

Figure 3:
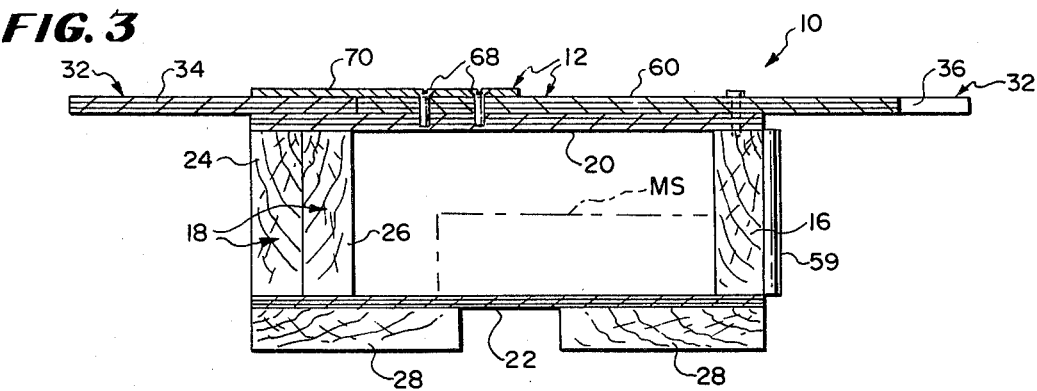
FIG. 3 is an enlarged vertical transverse sectional view taken on the plane indicated by the line 3—3 of FIG. 2 and in the direction of the arrows.

From the above description, it is believed that the nature and many advantages of the present miter box 10 will be readily apparent without further description. It should be understood, however, that the invention is not to be limited to the exact arrangement of parts shown in the accompanying drawings or described in this specification since various changes in the details of construction may be resorted to without departing from the spirit or scope of the invention. For example, although the rear wall 18 of the miter box body 14 has been illustrated and described herein as consisting of two wall boards 24 and 26 suitably secured to each other, it is obvious that a single board, appropriately shaped, may be employed if desired. The dimensions $a$, $b$ and $c$ have been stated herein as being critical ones which are dependent upon the dimensions of the particular electric saw with which the miter box is to be used, but many of the other miter box body dimensions are not critical. For example, as shown in FIG. 3, the width of the board 24 which constitutes the outer rear wall part is somewhat less than the width of the adjacent board 26 which constitutes the inner rear wall part. If desired, the width of such boards may be identical, in which case the top wall 20 would extend over the upper faces of both boards, the only criterion being that a maximum width planar surface be provided for steadying the sliding motion of the saw slide or shoe 58 when a given cut is made. The edge 66 of the auxiliary guide member or piece 12 is shown herein as being arcuate for convenience sake only, and if desired, such edge may be straight so that the flat plate-like part 60 is of truly triangular configuration. Obviously, if an undercut other than a 45° undercut as shown in FIG. 6 is required in the molding strip, the cross-cut 151 may be made to accommodate the desired undercut. Finally, it is within the scope of the present invention to fashion the right-hand end of the miter box body 14 in a complementary manner so that it corresponds to the left-hand end of the box and is provided with a cross-cut similar to the cross-cut 50. The provision of a second such cross-cut would enable the miter box 10 to be used with greater facility by a left-handed saw operator. Therefore, only insofar as the invention is particularly pointed out in the appended claims is the same to be limited.

Having thus described the invention what I claim as new and desire to secure by letters patent is:

1. A miter box for facilitating 45° cuts in the end portions of a molding strip or the like by means of a portable electric saw of the type that has a slotted slide shoe through which the rotary blade of the saw extends, said miter box comprising an elongated hollow open-ended body having a top wall for sliding reception of the slide shoe of the saw, a strip-supporting bottom wall, and front and rear walls, the opposite ends of said body being bevelled on a 45° bias so that the vertical planes thereof extend at a right angle to each other, and means on said top wall establishing a pair of guide edges for the inside edge of the slide shoe of the saw, said guide edges extending parallel to said bevelled ends of the miter box body and spaced therefrom a distance substantially equal to the distance between the inside edge of the saw slide shoe and the saw blade.

2. A miter box as set forth in claim 1 and wherein the top wall of the miter box body is formed with a finger-receiving opening between said guide edges whereby the molding strip may be steadied during the creation of 45° cuts in the end portions thereof.

3. A miter box as set forth in claim 2 and wherein said guide edges on the top wall of the miter box body are established by lengths of flat strip stock which traverse said top wall and have their opposite ends overhanging the front and rear edges of the latter.

4. A miter box as set forth in claim 3 and wherein said lengths of flat strip stock are integral and constitute the forward diverging arms of a V-shaped guide member which is fixedly but removably fastened to said top wall with the apex region of the member overhanging the front wall of the body and the distal ends of the diverging arms overhanging the rear wall of said body.

5. A miter box as set forth in claim 4 and wherein said finger-receiving opening is generally trapezoidal in configuration and largely embraces the intervening space between the diverging arms of the V-shaped guide member.

6. A miter box as set forth in claim 4 and wherein said V-shaped guide member is removably secured by clamping screws to the top wall of the miter box for replacement purposes.

7. A miter box for selectively facilitating 45° and 90° cuts in the end portions of a molding strip or the like by means of a portable electric saw of the type that has a slotted slide shoe through which the rotary blade of the saw extends, said miter box comprising an elongated open-ended body having a top wall for sliding reception of the slide shoe of the saw, a strip-supporting bottom wall, and front and rear vertical walls, the opposite ends of said body being bevelled on a 45° bias so that the vertical planes thereof extend at a right angle to each other, means on said top wall establishing a pair of guide edges for the inside edge of the slide shoe of the saw, said guide edges extending parallel to said bevelled ends of the miter box body and spaced therefrom a distance substantially equal to the distance between the inside edge of the saw slide shoe and the saw blade whereby, when the saw shoe is drawn across said top wall with its inside edge in sliding engagement with one of said guide edges, a 45° extrusion will be effected on the strip, an auxiliary guide piece separately formed from the miter box body, and cooperating locating means effective between said top wall and the auxiliary guide piece whereby the latter may be fixedly positioned on the former, said guide piece being provided with a guide edge which, when the guide piece is effectively located on said top wall, extends at a right angle to the longitudinal axis of the miter box body where, when the saw shoe is drawn across said top wall with its inside edge in sliding engagement with the guide edge on the guide piece, a 90° extrusion will be effected on the strip.

8. A miter box as set forth in claim 7 and wherein said top wall is formed with a finger-receiving opening between the guide edges whereby the strip may be steadied during creation of either a 45° or a 90° cut.

9. A miter box as set forth in claim 8 and wherein said guide edges are established by lengths of flat strip stock which traverse the top wall of the miter box body and have their opposite ends overhanging the front and rear edges of said top wall.

10. A miter box as set forth in claim 9 and wherein said finger-receiving opening is generally trapezoidal in configuration and largely embraces the intervening space between the lengths of flat strip stock which establish said pair of guide edges.

11. A miter box as set forth in claim 7 and wherein said auxiliary guide piece includes a generally triangular plate-like part having forwardly diverging side edges one of which lies flush with one guide edge of the pair of guide edges when the guide piece is effectively located on said top wall and the other of which constitutes the guide edge on said auxiliary guide piece.

12. A miter box as set forth in claim 11 and wherein said guide edges of the pair are established by lengths of flat strip stock which traverse the top wall of the miter box body and have their opposite ends overhanging the front and rear edges of said top wall, and said auxiliary guide piece further includes on the said generally triangular plate-like part an extension arm which overlies the adjacent length of flat strip stock and constitutes a linear extension of said guide edge on the auxiliary guide piece.

13. A miter box as set forth in claim 7 and wherein said auxiliary guide piece further includes an extension arm for the auxiliary guide piece and the arm overlies and extends across the adjacent guide edge of one of the pairs of guide edges.

14. A miter box as set forth in claim 7 and wherein the top wall and the vertical rear wall of the miter box body is formed therethrough with a cross-cut which intersects one of the bevelled ends of said miter box body and through which cut the blade of the saw is adapted to pass during creation of a 90° cut in the strip, said cut being spaced from the guide edge on said auxiliary guide piece when the latter is in position on said top wall a distance equal to the distance between the inside edge of the saw slide shoe and the saw blade.

15. A miter box as set forth in claim 14 and wherein the effective depth of said cut is equal to the effective cutting depth of the saw blade.

16. A miter box as set forth in claim 15 and wherein an additional transverse cross-cut is provided in the rear wall of the miter box body on a 45° undercut bias, the upper open portions of the two cross-cuts being coincident.

17. A miter box for facilitating 45° cuts in the end portions of a molding strip or the like by means of a portable electric saw of the type that has a slotted slide shoe through which the rotary blade of the saw extends, said miter box comprising an elongated hollow open-ended body having a top wall for sliding reception of the slide shoe, a strip-supporting bottom wall, and front and rear walls, means on said top wall establishing a pair of fixed elongated guide edges for the inside edge of the saw shoe, said guide edges extending at a right angle to each other and each guide edge extending at a 45° angle to the longitudinal axis of the miter box body, whereby when said saw shoe is drawn across said top wall with its inside edge in sliding engagement with a guide edge on said top wall, a 45° cut in the molding strip will be effected.

18. A miter box as set forth in claim 17 and including, additionally, a separately formed auxiliary guide piece, cooperating locating means effective between said top wall and said guide piece whereby the latter may be fixedly positioned on the former, and a guide edge on said guide piece which, when the guide piece is effectively located on said top wall, extends at a right angle to the axis of the miter box body whereby, when the saw shoe is drawn across said top wall with its inside edge in sliding engagement with the guide edge on the guide piece, a 90° cut in the molding strip will be effected.

19. A miter box as set forth in claim 1 and wherein a combined abutment and cam member is fixedly mounted on the forward face of the front wall of the miter box body in the immediate vicinity of one of the bevelled ends of said body and is designed for camming engagement with one end of the rotary arcuate safety shield which is associated with the blade of the saw.

20. A miter box as set forth in claim 7 and one end of the rear wall of the miter a box body is truncated in order to form in the vicinity of one of the bevelled ends of said body a planar abutment and cam surface which extends at right angles to the nearer guide edge and is designed for camming engagement with one end of the rotary arcuate safety shield which is associated with the blade of the saw.

* * * * *